(12) United States Patent
Adams (10) Patent No.: US 7,433,786 B2
(45) Date of Patent: Oct. 7, 2008

(54) METHOD OF ESTIMATING GEOLOGICAL FORMATION DEPTHS BY CONVERTING INTERPRETED SEISMIC HORIZONS THE TIME DOMAIN TO THE DEPTH DOMAIN

(76) Inventor: Steven L. Adams, 8015 White Marsh Ct., Spring, TX (US) 77379-6121

( * ) Notice: Subject to any disclaimer, the term of this patent is extended or adjusted under 35 U.S.C. 154(b) by 0 days.

(21) Appl. No.: 11/657,658

(22) Filed: Jan. 24, 2007

(65) Prior Publication Data
US 2007/0118293 A1 May 24, 2007

Related U.S. Application Data

(63) Continuation of application No. 10/924,477, filed on Aug. 24, 2004, now abandoned.

(51) Int. Cl.
G01V 1/40 (2006.01)
G01V 1/00 (2006.01)
(52) U.S. Cl. .......................................... 702/11; 367/33
(58) Field of Classification Search ............. 702/11–14, 702/2; 367/27, 33, 50
See application file for complete search history.

(56) References Cited

U.S. PATENT DOCUMENTS

| | | | |
|---|---|---|---|
| 3,466,593 A | 9/1969 | Siems et al. |
| 4,697,650 A | 10/1987 | Fontenot |
| 4,893,694 A | 1/1990 | Houck et al. |
| 5,058,079 A | 10/1991 | Wright et al. |
| 5,136,551 A | 8/1992 | Armitage |
| 5,144,589 A | 9/1992 | Hardage |
| 5,513,150 A | 4/1996 | Sicking et al. |
| 5,648,937 A | 7/1997 | Campbell |
| 5,754,493 A | 5/1998 | Al-Chalabi |
| 5,835,882 A | 11/1998 | Vienot et al. |
| 5,835,883 A | 11/1998 | Neff et al. |
| 5,838,634 A | 11/1998 | Jones et al. |

(Continued)

FOREIGN PATENT DOCUMENTS

EP 0367495 A2 5/1990

(Continued)

OTHER PUBLICATIONS

Smallwood et al., Use of Vo -K Depth Conversion from Shelf to Deep-Water: How Deep Is That Brightspot?, Feb. 2002, First Break, vol. 20, pp. 99-107.*

(Continued)

*Primary Examiner*—Michael P. Nghiem
*Assistant Examiner*—Toan M Le
(74) *Attorney, Agent, or Firm*—Raymond R. Ferrera (57) ABSTRACT

A method of estimating geological location depths by converting horizon data from the time domain to the depth domain is provided wherein the method includes at least a data accumulation step and a data evaluation step, and wherein the data evaluation step further includes assignment of greater statistical weight to data derived from closer data acquisition points than to data derived from further data acquisition points using a weighted regression analysis, with distance being one of several weighting criteria. Layer-by-layer computation of geological formation depths is achieved by extracting values from horizon time data set at exact geographic locations in the next deeper horizon, thereby allowing interval computations to be carried out without the need for gridding.

31 Claims, 6 Drawing Sheets

U.S. PATENT DOCUMENTS

| | | | |
|---|---|---|---|
| 5,894,417 | A | 4/1999 | Dorn |
| 5,899,958 | A | 5/1999 | Dowell et al. |
| 5,999,885 | A | 12/1999 | Van Bemmel et al. |
| 6,302,221 | B1 | 10/2001 | Hamman et al. |
| 6,374,201 | B1 | 4/2002 | Grizon et al. |
| 6,388,947 | B1 | 5/2002 | Washbourne et al. |
| 6,618,678 | B1 | 9/2003 | Van Riel |
| 6,912,466 | B1 | 6/2005 | Gao |

FOREIGN PATENT DOCUMENTS

| | | |
|---|---|---|
| EP | 0671017 A1 | 6/1997 |
| EP | 0956533 A1 | 11/1998 |
| EP | 1160586 A2 | 12/2001 |
| EP | 1189167 A1 | 5/2002 |
| WO | WO9508781 A1 | 6/1997 |
| WO | WO9834190 A1 | 11/1998 |
| WO | WO9836292 A2 | 11/1998 |

OTHER PUBLICATIONS

Al-Chalabi, M., 1997, Time-depth relationships for multilayer depth conversion: Geophys. Prosp., Eur. Assn. Geosci. Eng., pp. 715-720.

Beltrão, J. F., Silva, J. B. C., and Costa, J. C., 1991, Robust polynomial fitting method for regional gravity estimation: Geophysics, v. 56, No. 1, pp. 80-89.

Carter, M. D., 1989, Depth conversion using normalized interval velocities : The Leading Edge, v. 8, No. 1, pp. 15-16.

Japsen, P., 1993, Influence of Lithology and Neogene Uplift on Seismic Velocities in Denmark: Implications for Depth Conversion of Maps: AAPG Bulletin, v. 77, No. 2, pp. 194-..

Keho, T. and Samsu, D., 2002, Depth conversion of Tangguh gas fields: The Leading Edge, v. 21, No. 10, pp. 966-971.

Marsden, D., 1989, Layer cake depth conversion: The Leading Edge, v. 8, No. 1, pp. 9-14.

Marsden, D., 1992, Vo-K method of depth conversion: The Leading Edge, v. 11, No. 8, pp. 53-54.

Marsden, D., Bush, M. D. and Johng, D. S., 1995, Analytic velocity functions : The Leading Edge, v. 14, No. 7, pp. 775-782.

McCorkindale, D. and Hwang, L. -F., 1994, Velocity estimation for depth conversion of a 3-D data set in Troll field: A comparison of different techniques, 64th Ann. Internat.

Explorer, A complete system for time-to-depth conversion: Paradigm, The Geoscience Knowledge Company. 2003.

Etris, Edward L. et al, Nov. 2001, True Depth Conversion: More Than a Pretty Picture: CSEG Recorder, pp. 11-22.

Depth Team velocity modeling products of Landmark Graphics (a subsidiary of Halliburton): Web link: [http:www.lgc.com/productsservices/geophysicaltechnologies/default.htm] Oct. 12, 2004.

TDQ, a product of Landmark Graphics (a subsidiary of Halliburton). Web link: [http://www.lgc.com/productsservices/geophysicaltechnologies/default.htm] Oct. 12, 2004.

InDepth, a product of Schlumberger. Web link: [http://www.sis.slb.com/content/software/reservoir/geoframe/geophysics/indepth.asp] Oct. 12, 2004.

Velocity Modeling module of Gocad, a product of Earth Decision Sciences, Web link: [http://www.earthdecision.com/Products/VelocityModeling] Oct. 12, 2004.

Explorer EM, a product of Paradigm Geosciences. Web link: [http://www.paradigmgeo.com/products/explorer.php] Oct. 12, 2004.

3D Grid Depth Conversion module in Petrel, a product of Schlumberger. Web link: [http://www.sis.slb.com/content/software/reservoir/petrel/3d_grid_depth_conversion.asp?] Oct. 12, 2004.

GridSTAT, a product of Applied Computer Engineering (ACE). Web link: [http://www.gridstat.com/ACEweb/technol.htm] Oct. 12, 2004.

John R. Smallwood, Use of Vo-K depth conversion from shelf to deep-water: how deep is that brightspot?, First Break, vol. 20.0, Feb. 2002, pp. 99-107.

Cognot, Richard, 1994, Tying seismic to well data using structural uncertainties: Elf Geoscience Research Centre, pp. 494-497.

Made, Bussemaker, Peels, Werff, and Zijlstra, 1990, Depth Conversion Using Integrated Seismic, Well, and Geological Data, pp. 1259-1262.

\* cited by examiner

METHOD OF ESTIMATING GEOLOGICAL FORMATION DEPTHS BY CONVERTING INTERPRETED SEISMIC HORIZONS THE TIME DOMAIN TO THE DEPTH DOMAIN

CROSS-REFERENCE TO RELATED APPLICATIONS

The instant application is a continuation of U.S. Pat. No. 10/924,477, filed Aug. 24, 2004, now abandoned, to which application priority is hereby claimed.

FIELD OF THE INVENTION

The present invention relates generally to methods of estimating geological formation depths using interpreted seismic horizon data, and, in a particular, non-limiting embodiment, to a method of estimating geological formation depths by converting interpreted seismic horizon data from the time domain to the depth domain.

BACKGROUND OF THE INVENTION

Conventional interpretation of two-dimensional and three-dimensional seismic data typically results in a converted data set representing the two-way seismic travel time of energy waves reflected by geological deposits formed beneath the Earth's surface. Data representing specific geological formations are called seismic horizons, and are oftentimes named after the formation or type of geological layer being represented.

In the past decade, horizon data has usually been created by a seismic interpreter using a computer or processor of some type and an industry-specific software package. At least some of the data is interpreted manually by digitization using a graphical display of the seismic data. However, much of the horizon data is computer-generated, using automated interpretation processes applied to parameters supplied by the interpreter.

As those of ordinary skill in the pertinent arts will appreciate, both lateral and vertical variations in the velocity of sound waves beneath the Earth's surface can result in the creation of an inaccurate structural interpretation of the subsurface when methods emphasizing only time-domain data are employed. Consequently, accurate predictions of prospective drilling locations and estimated geological formation depths are difficult to achieve.

One prior attempt to convert seismic horizon time data into depth data can be found in U.S. Pat. No. 5,648,937, issued Jul. 15, 1997 to Campbell, entitled *Method and Apparatus for Correlating Geological Structure Horizons from Velocity Data to Well Observations*, which describes a method of calibrating horizon depth data using the known depths of seismic horizons at well locations, and then creating an error map that conforms the horizon data to the well depths. The velocities used to convert the horizon time data to depth data prior to calibration are derived from the seismic data using known techniques employed during what is generally referred to as the seismic processing phase.

The method of Campbell has proven to be deficient, however, in that it is fundamentally only a calibration technique wherein an approximate horizon depth value is adjusted so as to be consistent with known depths of existing wells, rather than a method of deriving a geophysically-consistent velocity function model between well locations using interval velocities from both well data and interpreted seismic horizons. As discussed in the background section of the Campbell patent, for example, it is well known that the use of processing velocities for depth conversion is highly susceptible to cumulative calculation error.

Figure 1:
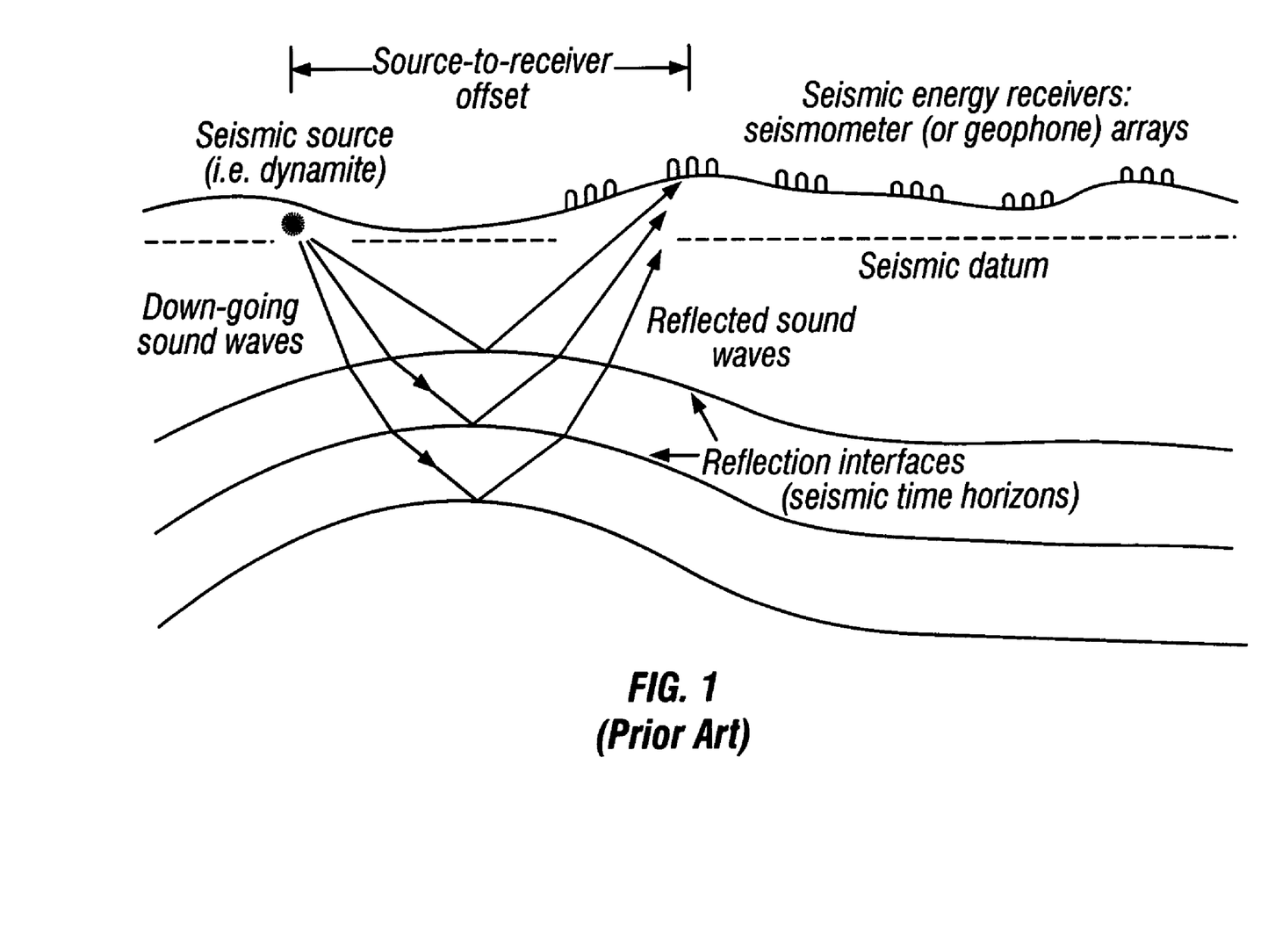
FIG. 1 is a cross-sectional view of a common seismic reflection method, in which recorded times are adjusted to remove source-to-receiver offset and other deleterious effects so that two-way travel times of horizons along a vertical path are derived.

Another deficiency of the Campbell method is that processing velocities are not in fact the true seismic velocities of the Earth, but estimates based on their effectiveness as parameters in the processing of data, the goal being to derive the best possible data images or signal-to-noise characteristics of a seismic reflector set (see, for example, prior art FIG. 1). Therefore, even after calibration at well locations, there is a great chance of significant computational error and uncertainty as to the actual geological conditions present between wells. In addition, irregular lateral deviations of processing velocities, which are common, can result in large computational errors in associated depth values.

In situations where existing well data is located far away, or where data is derived from wells located on the other side of a fault or are for some other reason unsuitable as a basis for data extrapolation, the method of Campbell is simply inadequate for establishing the relatively precise drilling depth estimates sought by modern geophysicists and drilling investors.

Figure 2:
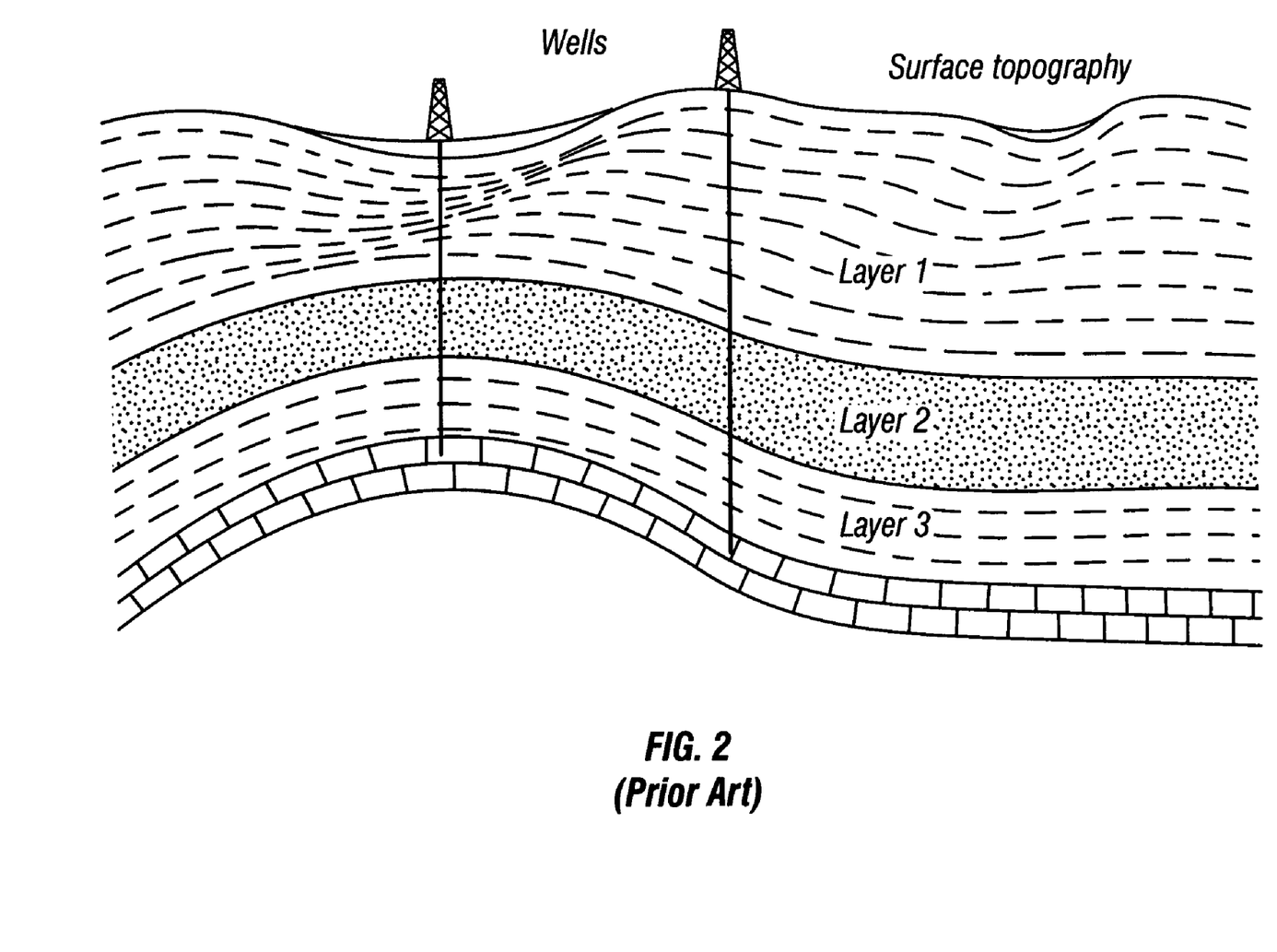
FIG. 2 is a cross-sectional view of the assumptions underlying past calculations of average interval velocities, in which $V_i(x,y,z) = V_{0i}(x,y) + [K_i(x,y) \times Z]$.

Another prior attempt to improve interpreted seismic results can be found in an article entitled *Depth Conversion of Tangguh Gas Fields*, published in the October 2002 edition of the exploration publication THE LEADING EDGE, in which authors Keho and Samsu attempt to show that by applying linear regression to a plurality of average velocities of the uppermost (shallowest) layer, the $V_o$ and K values present in the equation $V_{avg}=V_o+KZ$ (where $V_{avg}$ is the average velocity, $V_o$ is the velocity at zero depth, K is the compaction factor, and Z is the depth) can be derived so as to better estimate the horizon depth values associated therewith (see, for example, prior art FIG. 2). This and many other prior art techniques result from variations of the equation $V_i=V_0+KZ$, which abounds in the literature and defines the instantaneous velocity as a linear function of depth.

Figure 3:
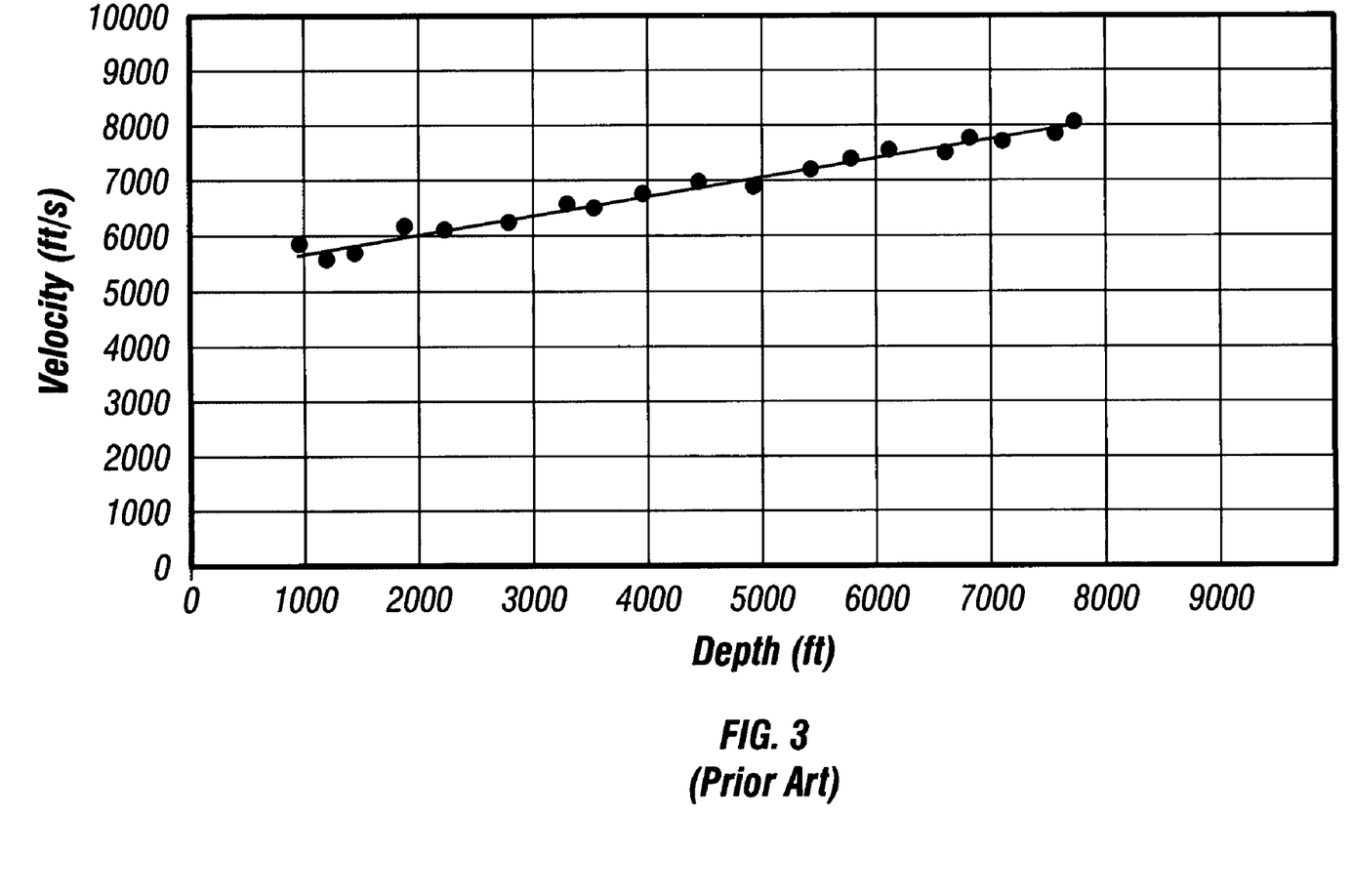
FIG. 3 depicts a conventional plot of seismic interval velocity versus depth as derived at a plurality of well locations, in which velocity values are extracted from formation top intervals and horizon seismic time intervals.

In the mentioned paper, Keho and Samsu show that the $V_o$ and K values for the shallowest layer can be extracted by applying linear regression to a plot of the average velocities versus formation top depths at the wells, so long as $V_o$ and K are approximately constant in the area containing the wells. As seen in prior art FIGS. 3 and 4, for example, a conventional plot of seismic velocity versus horizon depth can be established between and amongst known well locations, in which velocity values are extracted by comparison of the formation top depth intervals and the horizon seismic time intervals. In this model, the projected velocity at zero depth is defined as $V_o$ and the compaction factor K is indicated by the slope of the line (see FIG. 3). Even though the function is approximately linear, however, the data points do not lie exactly on the extracted line and therefore exact well ties will not result without additional calibration. In this case, well ties were achieved by holding K constant and mapping $V_0$ over the entire geographic area. More importantly, in instances where the interval velocity is not a linear function with respect to depth, which is the case for the second layer in their article, Keho and Samsu conclude this method is inadequate for estimating accurate drilling depth values.

In an article entitled *Analytic Velocity Functions* (THE LEADING EDGE, July 1995, pp. 775-782), Marsden et al. mention a method of obtaining a better linear fit for interval velocities as a function of depth called "robust fitting" (from Beltrao et al., GEOPHYSICS, 1991), where data points are weighted less as they deviate from the general trend. This weighting, however, is not based on geological assumptions and the resulting depth maps must still be calibrated at well locations using techniques such as error mapping (Japsen, AAPG Bulletin 1993). In their conclusion, Marsden et al. recommend in the conclusion the use of velocity logs to compute analytic functions and map the parameter variations ($V_0$ and K were two of the three parameters). This method, however, also has pitfalls as velocity logs are not always readily available, and it also requires considerable effort by the interpreter to derive the functions, map the parameters, and hopefully estimate the reliability of the values. Moreover, those of skill in the art will appreciate that a linear model establishing velocity increase as a function of depth can only result if the increase is due to compaction factors alone. Such an assumption, however, is often incorrect. For example, lithological changes that have occurred slowly over a great deal of geologic time, lateral and/or vertical changes in the composition of the sedimentary layer, and an inadequate number of horizons used to define layers with different velocity functions can all invalidate the linear model assumption.

Those of skill in the art will also appreciate that gridding of the data values is required, said gridding generally being carried out by means of computer mapping programs and previously known depth conversion techniques. In practice, most gridding processes compute original input data at evenly spaced bin intervals, so that computations can be carried out in a simple and efficient manner. Then, using the same bin intervals, gridded time values for deeper horizons are calculated directly beneath those of the shallower horizons, thereby making subsequent interval computations for time, thickness and velocity relatively fast and easy for the interpreter. In addition, there are often fewer data points after the gridding process, which also improves the data processing speed.

Gridding has many inherent shortcomings, however. For example, since gridding is fundamentally a sampling process, the accuracy of representing the input data set is primarily a combined function of the sampling interval and the variability or horizontal frequency of the input data. Moreover, in the case of geological mapping, exact well ties and determinations regarding the precise location and extent of faults are particularly problematic when gridded data is used.

For example, wells are rarely located exactly in the center of a grid bin, so the gridded depth values generally do not tie the original well values. In addition, faults can cause abrupt changes to geological formation structure, and bin intervals must be small enough to adequately sample such changes. As a result, precise computations around fault planes are necessarily compromised, especially when several finely spaced horizon time picks are averaged into one value for a grid bin disposed next to a fault plane. When applied to depth conversions, estimates using only gridding processes to determine the location of geological formations will incorporate error factors that are simply unacceptable to modern geophysicists and drilling investors.

In certain applications, three-dimensional sampling is also employed, which can create such a massive data volume that an extremely large amount of random-access memory is required, even though the problems associated with faulting and non-exact well ties are not significantly reduced. For example, when three-dimensional sampling is employed, not only are the geographic locations inaccurate, the depths of the formation tops are also. In short, even if a geophysically consistent solution of the velocity model between well locations could be determined, conventional gridding processes simply do not provide adequate precision as to allow an accurate conversion of horizon time data into depth values.

In view of the many longstanding problems present in the prior art, there is clearly a significant need for more reliable methods of converting interpreted seismic horizons derived from time values into accurately estimated depth values. The present invention is therefore directed to the development of more reliable methods of solving these problems.

SUMMARY OF THE INVENTION

The instant disclosure teaches a method by which the depth of a geological formation is estimated by converting interpreted seismic horizons from the time domain to the depth domain. According to a specific, non-limiting embodiment of the invention, the disclosed method teaches a step of accumulating data relating to one or more of interpreted horizon data, well surface location data, formation top name data, formation top measured depth data, directional survey data, and digitized fault outline data. In embodiments wherein digitized fault outline data is included, the digitized fault outlines are used to approximate geographical points at which a seismic horizon is interrupted by a fault.

According to another specific, non-limiting embodiment, the disclosed method teaches a step of evaluating accumulated data, in which the data is first sorted by geographic location, and then distributed into map areas containing approximately the same number of data points. In further embodiments, the data is used to determine the end point locations of an associated fault polygon. In still further embodiments, the data is evaluated so as to compute a true vertical depth and a geographic location relating to well surface locations and directional survey data for each formation top.

In other embodiments, data is evaluated to extract horizon times at a plurality of formation top geographic locations by means of a re-location data extraction process. In a presently preferred embodiment, the horizon times are additionally extracted at a plurality of geographic locations of the next existing deeper horizon using the same re-location data extraction process.

In still other embodiments, the data is evaluated to establish an interval velocity as a function of depth and/or the inverse of an average interval velocity as a function of total travel time, and to determine the accuracy of a linear assumption by computing a squared error of a weighted deviation from a computed regression line. In other embodiments, weight is assigned to the various data values using weighted regression analysis at each of a plurality of formation top locations. In certain embodiments, the weighting used in the weighted regression analysis is based primarily on either distance or faulting factors, while in other embodiments weighting is also based on the difference between a horizon time and a data point time. In still further embodiments, weighting is also based on relative geographic orientation criteria for data points having approximately the same horizon time. In this situation, weighting is reduced for individual data points located very close together that have approximately the same horizon times. Additionally, data points that are located geographically behind one or more of the other points that have approximately the same horizon times are not used at all.

In some embodiments, the data is used to compute an initial velocity and a line slope based on a weighted regression analysis of velocity data values plotted as a function of depth or inverse velocity values plotted as a function of seismic travel time. In other embodiments, a reliability value based on a statistical deviation of velocity data values measured relative to a computed line is derived, which, in a presently preferred embodiment, is expressed as a percentage deviation of velocity.

In certain embodiments, the reliability or percent deviation value is used in conjunction with a transition range of values to determine the relative proportions of the average interval velocity value obtained from the weighted regression method and an average interval velocity value obtained by an interpolation method to be used in computing the final average interval velocity value. For each horizon time value, the percent deviation value is compared to the upper and lower boundaries that define the transition range. In some embodiments, a percent deviation value that is within the boundaries of the transition range will result in a final velocity being computed by blending the velocities derived from the two methods. In other embodiments, percent deviation values closer to the smallest value or lower boundary of the transition range will be biased toward the velocity derived from the weighted regression technique and values closer to the upper boundary will be biased toward the velocity derived from the interpolation method. In further embodiments, a percent deviation value less than the smallest value in the transition range results in the final average interval velocity being equal to the value obtained from the weighted regression analysis. In still further embodiments, a percent deviation value greater than the largest value or upper boundary of the transition range results in the final average interval velocity being equal to the value obtained from the interpolation method. In yet further embodiments, the interpolation method uses a re-location data extraction method for the average interval velocities at each horizon time location.

BRIEF DESCRIPTION OF THE DRAWINGS

Prior art

Prior art

Prior art

Prior art

DETAILED DESCRIPTION OF THE INVENTION

Referring again for a moment to prior art FIG. 2, one embodiment of the invention assumes an Earth model in which the subsurface comprises a single, albeit complex, geological layer disposed between the Earth's surface and a relevant seismic horizon. In other embodiments, the accuracy of the disclosed data conversion method is improved for successive seismic horizons by assuming that the Earth's subsurface is not a single layer, but rather a series of layers, wherein horizon data relating to the shallowest horizon is first converted from time to depth, and the resulting depth data is then factored into subsequent conversion of data for the deeper horizons.

One of the techniques employed in the method of horizon depth conversion disclosed herein is the computation of successive interval velocities for each geological layer. As referred to in the instant disclosure, therefore, the term "geological layers" refers to layers of the Earth's subsurface that are disposed between geologic formation tops, each of which produce seismic reflections subsequently mapped by interpreters as seismic horizons.

One known method of obtaining depth conversion solutions comprises determining the interval velocities of each layer, converting each layer to interval thickness in depth units, and then summing these values together to derive an estimated depth for the various horizons. This method is commonly referred to as the "layer stripping" approach. In contrast, while the technique of estimating geological formation depths disclosed herein bears some resemblance to the layer-stripping method, it is distinct from all presently known layer-stripping approaches with respect to the manner in which interval velocities used in the thickness computations for each layer are calculated and subsequently applied.

In a presently preferred embodiment of the invention, a method of estimating geological formation depths by converting horizon data from the time domain to the depth domain comprises a first step of either accumulating data or inputting data into a computer or processor, and a second step of either evaluating the accumulated data or processing the inputted data using a computer or processor. In some embodiments, the data inputting step further comprises inputting data relating to one or more of: interpreted horizon data, well surface locations, formation top names, formation top measured depths, and directional survey data for wells having boreholes that deviate significantly from a vertical axis. In other embodiments, the method comprises inputting data relating to digitized fault outlines (or polygons) for each seismic horizon. In a presently preferred embodiment, the digitized fault line data is used to estimate geographical points at which the seismic horizon is interrupted by a fault.

According to one example embodiment, access performance of the horizon data is improved during the data processing step by sorting the data according to the geographic locations associated with each data point. In a presently preferred embodiment, geographic areas of differing size are computed such that each area contains approximately the same number of input data values, thereby normalizing the differing geographic sizes, and allowing searches for data points to require only the data set obtained from the geographic areas where they may exist, rather than from the entire data set.

In a further embodiment, sorted horizon data is loaded into the random-access memory (RAM) of a computer or processor, or is instead organized by an interpreter, such that each packet of discrete horizon data can be considered independently and in any order, rather than sequentially and in a predetermined order. In still further embodiments in which fault data has been input, fault data is also stored in a processor's memory. In a yet further embodiment, computations are performed to determine where the end points of a fault are located geographically.

According to another example embodiment, an interpreter decides which formation top name corresponds to the active horizon. The formation top data is usually interpreted from electric logs and is often, though not always, available digitally in some form, such as a spreadsheet or an on-line database, with consistent formation top names used for all of the wells. According to other example embodiments, data regarding the surface locations of wells and/or available directional survey data are used to compute a true vertical depth (TVD) and an actual geographic location for each formation top.

Figure 4:
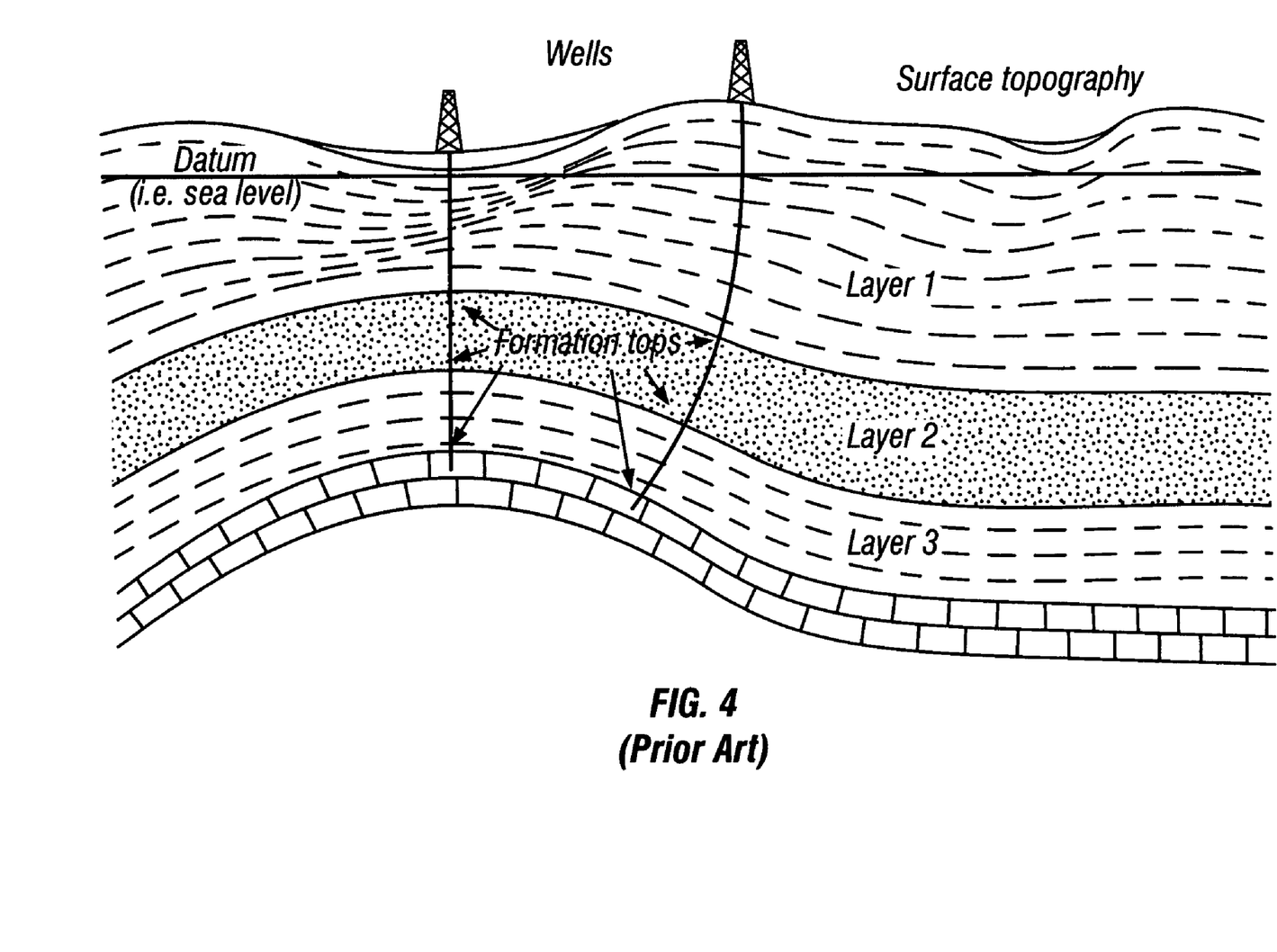
FIG. 4 is a cross-sectional view of several subsurface stratigraphic layers, in which formation tops are shown in proximity with associated well bores.

Prior art FIG. 4 shows a vertical well bore and a well bore that has been directionally drilled. Those of skill in the art will appreciate that the measured depths of formation tops in directionally-drilled wells are not the same as their TVD, nor are the geographic locations of the formation tops the same as the surface locations of their associated wells. Therefore, the TVD and geographic locations of the formation tops must be computed.

According to some example embodiments, the mentioned data processing step further comprises the use of horizon times at the precise geographic locations of each formation top disposed in association with a borehole. In certain embodiments, these horizon times are then stored in a processor's memory along with geographic location data. However, since horizon times are rarely available at the exact geographic locations of the formation tops in the wells, an ancillary data extraction process is often required, the particulars of which are next discussed.

To begin with, those of ordinary skill in the art will appreciate that several known data extraction techniques exist, and that any or all such techniques could theoretically be applied to the present invention without departing from the scope or spirit thereof. In a presently preferred embodiment, for example, a suitable data extraction method comprises the so-called re-location data extraction method (RDEM).

The basic requirements for a RDEM comprise: (1) extraction of data values from a three-dimensional data set, including longitudinal and latitudinal location data values, at sites disposed either within the boundaries of, or in proximate disposition to, the data set, provided that such sites are different than those of the original data set; (2) extraction of values consistent with a three-dimensional surface defined by the original data set; (3) extrapolation of a geologic dip for requested locations disposed outside the data set boundaries; and (4) extrapolation of the geologic dip near faults using transition zones tending toward the endpoints of the fault polygons for purposes of mapping continuity.

Figure 6:
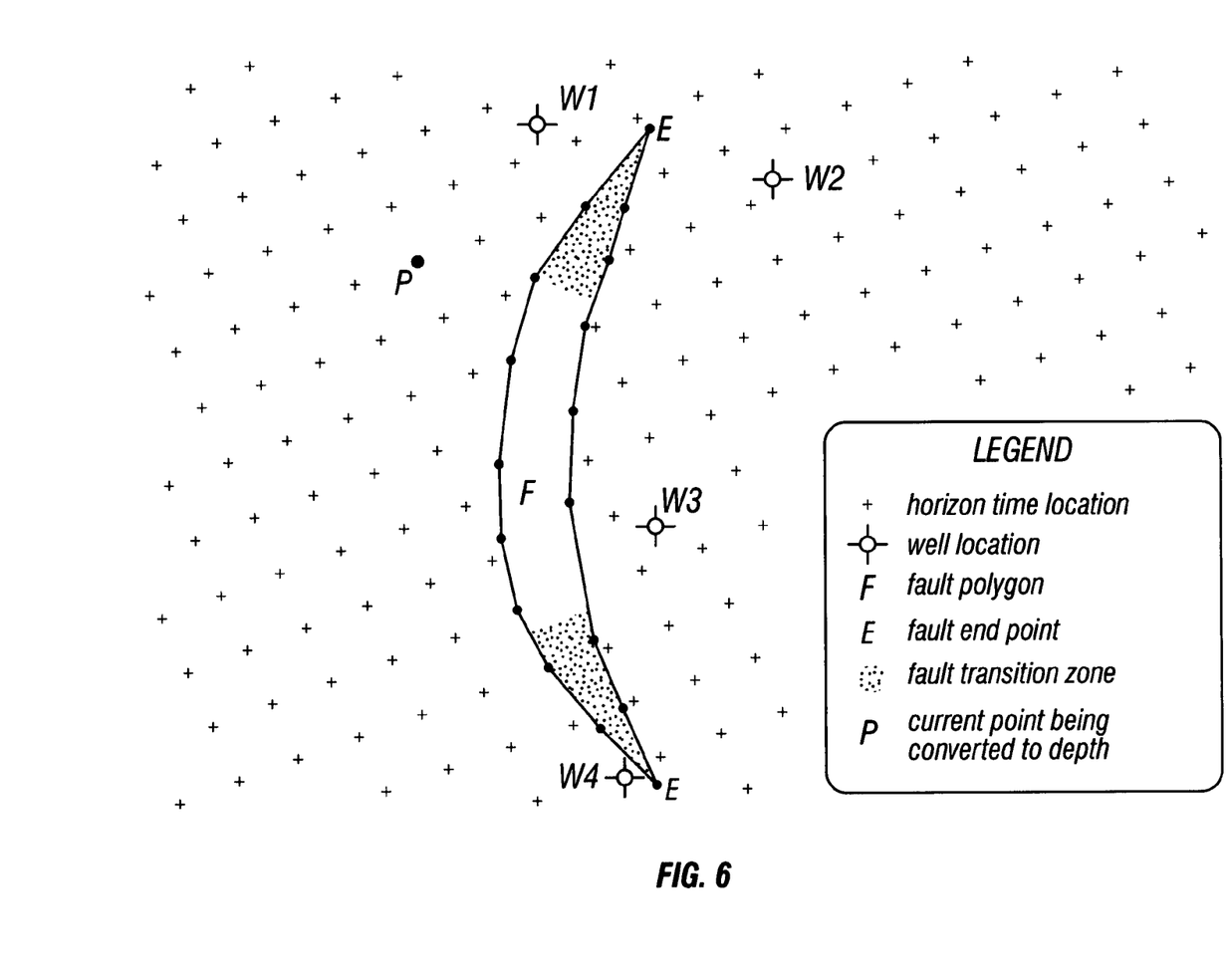
FIG. 6 is a map view showing horizon time locations, a crescent-shaped fault polygon, and some well locations, demonstrating the effects of a fault polygon on the weights applied to wells when converting the horizon time at point P to depth according to the invention.

A fault polygon is defined herein as an outline in a map view of the geographic locations where the fault intersects the active horizon. FIG. 6 is a map view showing horizon time locations, a crescent-shaped fault polygon, and some well locations. FIG. 6 visually demonstrates the effects of a fault polygon on the weights applied to the wells when converting the horizon time at point P to depth. For example, the fault will not influence the weighting of wells W1 and W4 since they are on the same side of the fault as P. The weighting of well W2 will be influenced by the fault, but at a reduced amount because a transition zone is present between P and W2. The weighting of well W3 will have the maximum fault effect because the main body of the fault lies between P and W3.

The basic RDEM process comprises summing and normalizing weighted values obtained by projecting data values within a predefined search distance using corresponding directional dip values. According to various embodiments of the invention, one or more factors are used to weight the projected data values, for example, one or more factors selected from the group comprising: fault effects; distance to a power; a shadow factor; and an azimuthal clustering correction factor.

Turning now to a brief discussion regarding the individual weighting factors, those of skill in the art will appreciate that fault effects are generally computed such that, as the distance from an end of the fault increases, data values from the opposite side have less effect on the computations. Thus, as depicted in FIG. 6, there is a transition zone at each end of the fault disposed between the actual end of the fault, where there is no computed fault effect, and a point beyond which the maximum fault effect is computed. The maximum fault effect determined by an interpreter could range from 0% to 100%, the latter being such that a data value on the opposite side of the fault is not used at all when an imaginary line drawn from the location of the point being computed to that point intersects the fault polygon between the transition zones associated with each end of the fault.

Weighting by distance to a power means the projected value is weighted as a function of $1/d^x$, where x is the power to which the distance value is raised. For example, weighting by a power of 2 implies that the value is weighted as a function of $1/d^2$. Those of skill in the art will appreciate that weighting values by a non-integer power is also permitted, and will not deleteriously affect the computed results.

A shadow factor is the effect of a value disposed behind a nearer value, so that the more distant value is said to be within the "shadow" of the nearer. In the present method, values in a shadow zone are used only for dip computations. Values from locations that are behind a data point that is already in a shadow zone are not used at all. Weighting by a shadow factor has the advantage of being geologically consistent, since data values originating from far away should be totally disregarded, rather than weighted less, when values and dips can be computed from data points located in the same direction that are geographically closer. Again, there is a transition zone, ranging from a region having no shadow effect to a region having a total shadow effect, the transition zone being dependent on how far a particular data point is disposed behind another.

Finally, an azimuthal clustering correction factor is employed so that values obtained from multiple data points located in approximately the same direction from the location being computed are combined into essentially one value, with a transition zone being established for purposes of mapping continuity. The azimuthal clustering weight factor therefore prevents biasing of the mapped values toward areas where there happens to be more data points clustered together than in other areas.

Whichever data extraction method is ultimately employed, and irrespective of which particular weight assignment factors are incorporated into the analysis, it is important to note that, according to the contours of the present invention, the geographic locations of the formation tops are not re-located as they would be if a gridding process were applied instead. To the contrary, only the horizon times are extracted at new locations. In short, even though horizon time data often does not exist at exactly the well or formation top locations, it often surrounds such locations, and thus extraction of valid time data is still achieved.

Returning now from the aforementioned data extraction and statistical weighting techniques, it is contemplated that after the horizon time values have all been extracted at associated formation top locations, the specific method of estimating geographical formation depths claimed herein continues, beginning with the shallowest horizon first.

According to a presently preferred embodiment, an interval velocity established as a function of both the depth and total travel time is computed from the formation tops and from the travel times at the well locations. Since the depth and time to a given horizon generally differ between wells, the method uniquely approximates the layer's true interval velocity curve as a function of either time or depth, provided the function remains approximately consistent laterally. Those of skill in the art will appreciate that if velocity increases linearly with depth, then the inverse (or reciprocal) of the velocity must decrease linearly in proportion to the time. The term slowness has been used in prior art for the inverse or reciprocal of velocity, but is not used in the discussion of the present invention. In a presently preferred embodiment, extraction of the parameters defining a linear relationship of interval velocities with depth and/or the inverse of interval velocities with time together with an estimate of expected error using a weighted linear regression model is carried out, the particulars of which are as follows.

First, interval velocities are derived at each of the well locations as a function of the data obtained from horizon times and formation tops. Then, for each horizon time location, the weighted regression technique of the instant method is applied to extract values for $V_0$ and K in the equation $V_{ai}=V_0+KZ_{mid}$ and to determine a measure of how accurately the data can be described by this linear equation.

In the aforementioned formulation, $V_{ai}$ is defined as the "average interval velocity" of a layer, i.e., the layer thickness divided by the one-way seismic travel time through the layer. This term is synonymous with the term "interval velocity" as used throughout the instant specification, though it is distinct from the term "instantaneous interval velocity" sometimes found in other geophysics-related literature. $V_o$ is defined as the hypothetical initial velocity for the layer at the surface of the earth. K is defined as the rate of the increase in velocity with respect to depth, while $Z_{mid}$ is defined as the vertical depth to the middle of the layer as measured from a predetermined datum elevation point disposed near the Earth's surface. The prior art term "one-way time" refers to one-half of the actual time extracted from the seismic data, because the seismic energy first went downward through the Earth's subsurface and then upward through it again after being reflected from the relevant interface.

Assuming horizon times between wells are available, the instant method attempts to calculate both $V_o$ and K, and ultimately the geological formation depth Z, by assuming a linear relationship of the depth and average interval velocity. Fundamentals of the mentioned calculations are as follows.

First, an interpreter must estimate at each horizon pick location how well a linear relationship of interval velocity as a function of depth matches data obtained from wells for each layer in the area surrounding the desired location. Then, based upon the computed "certainty" of the interpreter's linear assumption, the resulting interval velocity value is used either in its entirety, or as blended with a value obtained by an interpolation method. In certain instances (for example, where the interpreter determines that a very poor linear fit has been obtained, and thus the certainty of the linear assumption is very low), the interval velocity derived from the interpolation method is instead used in its entirety and the interval velocity value derived from the linear method is disregarded. A presently contemplated method for determining how well a linear relationship of interval velocity as a function of depth matches the data obtained from each layer in the area surrounding the desired location is as follows.

Figure 5:
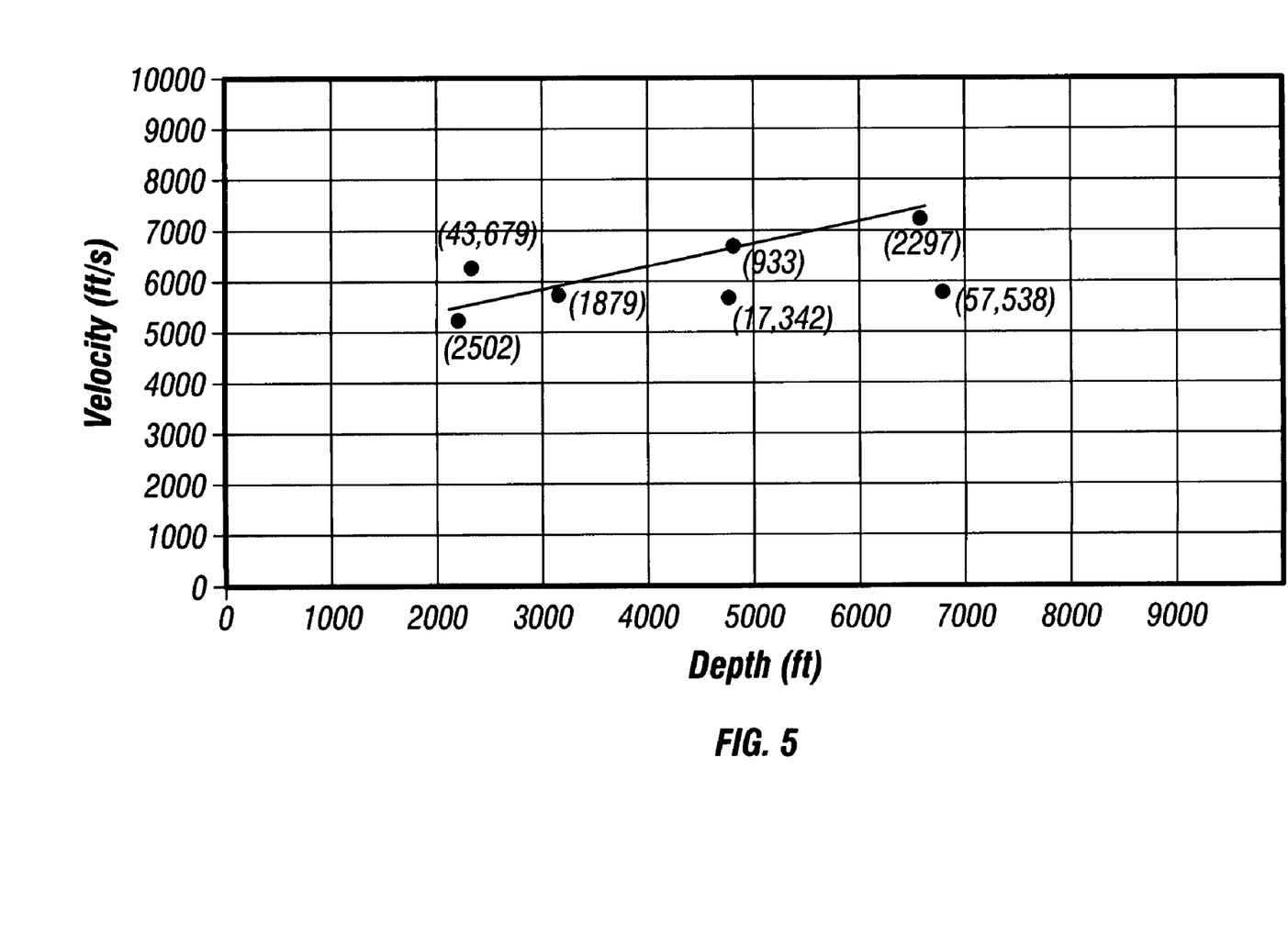
FIG. 5 depicts a weighted regression plot according to the present invention, in which values from closer locations are weighted greater than values obtained from more remote locations.

First, as seen in FIG. 5, a weighted linear regression is applied, and a measurement of how well the data points fit the resulting line is performed at each horizon time location. The weighting of each interval velocity used in the analysis is based on (1) the geographic distance between the horizon time location and the relevant well location (or formation top location for directionally-drilled wells), (2) the difference between the horizon time and the time of the formation top at the formation top location, (3) data regarding faults that lie between the horizon time location and the well location, and (4) other factors related to the spatial orientation of the wells with respect to one another.

The disclosed weighted linear regression analysis results in a standardized regional extraction of $V_o$ and K values, and provides a smooth transition across the entirety of the map, in contrast to the results obtained from incorporation of the data points when equally weighted. Maps of $V_o$ and K can therefore be obtained wherein the only assumptions present are (1) that $V_o$ and K change gradually rather than instantaneously, and (2) that sufficient well control data is available to detect those changes.

In some cases, however, there is insufficient well control data available to permit accurate determination of the $V_o$ and K values. There are also cases where the basic assumption of the linear relationship simply does not apply. Moreover, there are examples in practice where the average velocities show an apparent decrease with seismic time due to lateral velocity changes. In such instances, a more precise measure of certainty is needed to determine the relative weighting of the two methods.

According to one example embodiment, the accuracy of the linear assumption is determined by computing the squared error of the weighted deviations from the computed regression line. In another embodiment, the weighting method is the same method previously described in the specification. In any event, the statistical measure of data scatter will determine the certainty of the linear assumption, and is unique in that values that are located either geographically or geologically further away from the horizon time location ultimately contribute less to both the linear regression analysis and the error analysis of the results.

In summary, the weighted linear regression model disclosed herein establishes that interval velocities vary not only with depth, but also with respect to their geographic area. Therefore, if a linear relationship does in fact exist between the interval velocity of the geologic layer and its depth, the parameters defining the linear relationship may also vary with respect to the geographic area. The linear relationships may also turn out to be valid in certain geographic areas, but invalid in other areas. While certain prior art has recognized these phenomena, there has not previously existed a method of weighting by geographic distance and the other criteria of the instant method in a regression analysis used to compute the line slope K, the initial velocity $V_o$, and a reliability value. In a presently preferred embodiment, the weighted regression method disclosed herein is employed at every input horizon time location. While processing each horizon time location, weights are assigned to the values used in the regression analysis based primarily on distance, faulting and the difference between the horizon time and the data point time. The effect of each data point in the regression analysis at every horizon time location is determined by the weight assigned to it, whereas standard linear regression weights all data values equally.

In one example embodiment, the results of this weighted regression technique include determination of the initial velocity $V_o$ and the slope K, as well as a value related to the reliability of these computed values based on a statistical deviation of the velocity data values relative to the computed line. In a presently preferred embodiment, the reliability value is expressed as a percentage deviation of the velocity, thereby allowing a computation of the most likely depth conversion error range, and the variables $V_o$, K and the reliability value to be mapped independently.

According to a further embodiment, the thickness for a given layer can be established using the computed values of $V_o$ and K at all horizon time locations. To establish the mentioned values, the interpreter first computes an average interval velocity for the layer at each horizon time location using the prior art equation $V_{ai}=(V_0+KZ_{top})/[1-K(T_{horz}-T_{top})/2]$, which can be derived from $V_{ai}=V_0+KZ_{mid}$ by substituting $Z_{top}+V_{ai}(T_{horz}-T_{top})/2$ for $Z_{mid}$. The values $Z_{top}$ and $T_{top}$ are the depth and one-way time to the top of the layer, respectively, and $T_{horz}$ is the one-way horizon time at the bottom of layer. The thickness of the layer is computed by $\Delta Z=V_{ai}*(T_{horz}-T_{top})$.

In the aforementioned equations $V_{ai}=(V_0+KZ_{top})/[1-K(T_{horz}-T_{top})/2]$ and $\Delta Z=V_{ai}*(T_{horz}-T_{top})$, the values for $T_{top}$ and $Z_{top}$ must be at the same geographic location as that of the horizon time presently being converted to depth. However, locations of horizon times for the horizon above are not necessarily the same as those of the current horizon since the instant method uses the actual locations and not gridded locations. The instant method therefore provides a unique method of extracting $T_{top}$ and $Z_{top}$, which can be described as follows.

While computing a given layer's thickness, the values for $T_{top}$ for the underlying layer are computed. This is done by extracting times from the current horizon time data at the exact geographic locations of the time values of the next deeper horizon using the aforementioned re-location data extraction method. $Z_{top}$ values for the underlying layer are actually the corresponding depths at the bottom of the current layer. Therefore, $Z_{top}$ values for the underlying layer are computed using the extracted $T_{top}$ values as horizon times and converting to depth with the interval velocities of the current layer. Thus, $T_{top}$ and $Z_{top}$ for the current layer have already been computed by the time the current horizon is being converted to depth. Obviously, the values of $T_{top}$ and $Z_{top}$ are both zero for the uppermost layer, since the Earth's surface serves as a natural upper boundary.

The unique weighting method disclosed herein results in the interval velocities converging with those directly computed at the well locations, so that resulting depth values at well locations always tie perfectly. In some embodiments, there may be areas of a map where the interval velocity for a given layer does not appear to be increasing linearly with depth. This phenomenon can be due to a variety of reasons, some of which are based on geology, while others are based on an insufficient number of wells and/or horizons to adequately sample the velocities. However, the aforementioned reliability value expressed as a percentage velocity deviation reveals such areas, though the method still assumes that velocities will generally increase as a function of depth, even though there is insufficient input data to determine the velocities in such problem areas. Accordingly, an alternative interpolation method to compute the interval velocities in the problem areas is provided as a further aspect of the invention, said method utilizing a mapping process similar to the process disclosed above to extract horizon times at well locations.

In one such embodiment, a K value is either statistically determined using the input data or is provided by an interpreter, and $V_o$ values are extracted at the horizon time locations using the mapping process after computation at each formation top location. In a further embodiment, the $V_o$ values are not projected beyond the boundaries of the area enclosed by the wells; instead, they are interpolated using the same weighting techniques employed by the aforementioned relocation data extraction method. In a still further embodiment, the computed percentage deviation value incorporates an acceptability transition zone, in which values obtained using the alternative method are blended with those computed using the weighted regression technique to provide continuous mapping of the geological structure.

After the thickness of a given layer is computed and assigned a value, the value is summed with the depth to the top of the layer to derive an estimated depth to the horizon value, which resides at the bottom of the layer. In order to continue the process to the next deeper horizon, horizon times and depths of the shallower layer must be located at the exact geographic locations of those of the deeper layer. In a presently preferred embodiment, the time values are extracted at the geographic locations of the next deeper horizon's time values using the same method employed to extract horizon times at well locations disclosed above. Following extraction of the horizon times at the new locations, depth values can then be computed at the new locations. Thereafter, the process is repeated until all of the horizons have been assigned estimated depth values.

The foregoing specification is provided for illustrative purposes only, and is not intended to describe all possible aspects of the present invention. Moreover, while the invention has been shown and described in detail with respect to several exemplary embodiments, those of ordinary skill in the art will appreciate that minor changes to the description, and various other modifications, omissions and additions may also be made without departing from the spirit or scope thereof.

The invention claimed is:

1. A method of estimating geological formation depths by converting interpreted horizon data from the time domain to the depth domain, said method comprising:
   a first step of accumulating data;
   and a second step of evaluating data, wherein said second step of evaluating data further comprises a step of assigning weight to accumulated data using weighted regression analysis at each of a plurality of formation top locations;
   and wherein said step of assigning weight to accumulated data further comprises assigning weight based on relative distance, with data obtained from a nearer location being assigned more weight than data obtained from a further location;
   and wherein said second step of evaluating data further comprises a step of determining a plurality of end point locations associated with a fault polygon.

2. The method of claim 1, wherein said first step of accumulating data further comprises a step of accumulating interpreted horizon data.

3. The method of claim 1, wherein said first step of accumulating data further comprises a step of accumulating well surface location data.

4. The method of claim 1, wherein said first step of accumulating data further comprises a step of accumulating formation top name data.

5. The method of claim 1, wherein said first step of accumulating data further comprises a step of accumulating formation top measured depth data.

6. The method of claim 1, wherein said first step of accumulating data further comprises a step of accumulating directional survey data.

7. The method of claim 1, wherein said first step of accumulating data further comprises a step of accumulating digitized fault outline data.

8. The method of claim 7, wherein said step of accumulating digitized fault outline data further comprises using said digitized fault outline data to approximate geographical points at which a seismic horizon is interrupted by a fault.

9. The method of claim 1, wherein said first step of accumulating data further comprises accumulating data selected from the group consisting of interpreted horizon data, well surface location data, formation top name data, formation top measured depth data, directional survey data and digitized fault outline data.

10. The method of claim 1, wherein said second step of evaluating data further comprises sorting accumulated data according to geographic locations associated with said accumulated data, and then distributing a plurality of data points into discrete areas that each contain approximately the same number of data points.

11. The method of claim 1, wherein said second step of evaluating data further comprises a step of computing a true vertical depth value for a plurality of formation tops as a function of accumulated well surface location and directional survey data.

12. The method of claim 1, wherein said second step of evaluating data further comprises a step of computing a geographic location estimate for a plurality of formation tops as a function of accumulated well surface location data and directional survey data.

13. The method of claim 1, wherein said second step of evaluating data further comprises a step of extracting horizon times at a plurality of formation top geographic locations.

14. The method of claim 13, wherein said step of extracting horizon times further comprises a re-location data extraction step.

15. The method of claim 1, wherein said step of evaluating data further comprises a step of extracting horizon times at a plurality of geographic locations of data points associated with a next existing deeper horizon.

16. The method of claim 15, wherein said step of extracting horizon times further comprises a re-location data extraction step.

17. The method of claim 1, wherein said second step of evaluating data further comprises a step of establishing an average interval velocity as a function of the depth of an average interval velocity as a function of total travel time.

18. The method of claim 1, wherein said second step of evaluating data further comprises a step of determining an accuracy of a linear assumption by computing a squared error of a weighted deviation from a computed regression line.

19. The method of claim 1, wherein said step of assigning weight to accumulated data further comprises assigning weight based on locations relative to a fault polygon.

20. The method of claim 1, wherein said step of assigning weight to accumulated data further comprises assigning weight based on a difference between a horizon time and a data point time.

21. The method of claim 1, wherein said step of assigning weight to accumulated data further comprises assigning weight based on relative geographic location criteria when a time difference between two or more data points is negligible, and one or more of said data points is geographically located behind another of one or more said data points.

22. The method of claim 1, wherein said second step of evaluating data further comprises a step of determining an initial velocity and a line slope based on a weighted regression analysis of velocity plotted as a function of the depth of velocity data values plotted as a function of seismic travel time.

23. The method of claim 1, wherein said second step of evaluating data further comprises a step of determining a reliability value based on a statistical deviation of velocity data values measured relative to a computed line.

24. The method of claim 23, wherein said reliability value is expressed as a percentage deviation of velocity.

25. The method of claim 24, wherein said reliability as a percent deviation value is used in conjunction with a transition range of values to determine a relative proportion of average interval velocity values obtained from said weighted regression analysis, and an average interval velocity value to be used in computing a final average interval velocity value is obtained using an interpolation method.

26. The method of claim 25, wherein said interpolation method uses a re-location data extraction method when determining average interval velocities at each horizon time location.

27. The method of claim 25, wherein a percent deviation value greater than the smallest value in said transition range, but less than the largest value in the range, results in a proportional blending of interval velocities from said weighted regression analysis and said interpolation method.

28. The method of claim 27, wherein said blending of interval velocities derived from said weighted regression analysis and said interpolation method is based on a value of the percent deviation compared to a smallest value and a largest value in the said transition range.

29. The method of claim 28, wherein a percent deviation value closer to said smallest value in a transition range biases a final velocity determination toward the velocity derived by weighted regression analysis, and a percent deviation value closer to said largest value in said transition range biases the final velocity toward the velocity derived by said interpolation method.

30. The method of claim 28, wherein a percent deviation value less than the smallest value in the transition range results in the final average interval velocity being equal to the value obtained from the weighted regression analysis.

31. The method of claim 28, wherein a percent deviation value greater than the largest value in the transition range results in the final average interval velocity being equal to the value derived from the interpolation method.

* * * * *